R. T. SIMMONS.
COTTON CHOPPER.
APPLICATION FILED MAR. 17, 1910.
997,015.
Patented July 4, 1911.
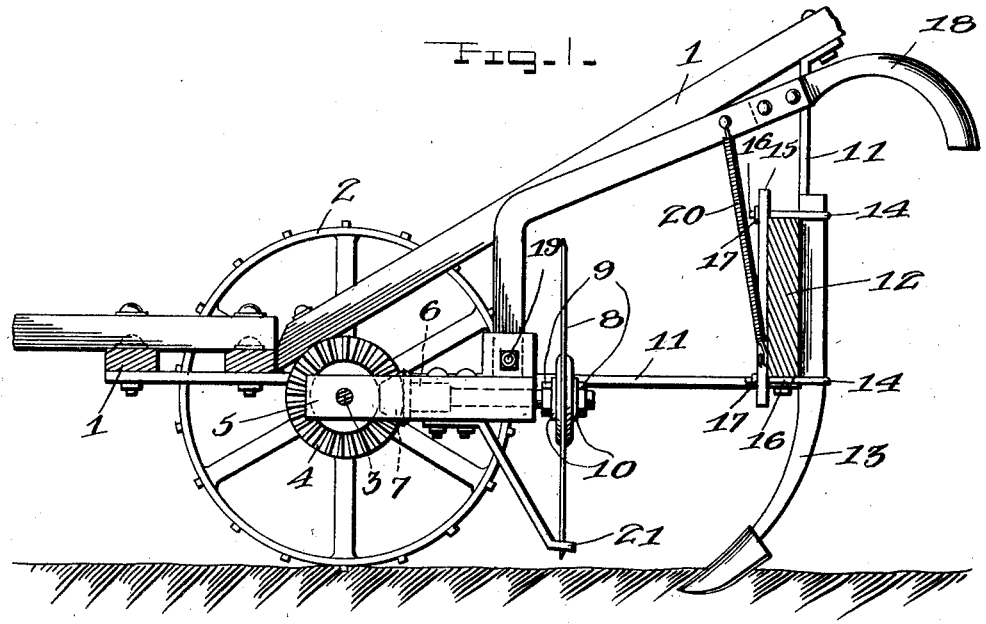
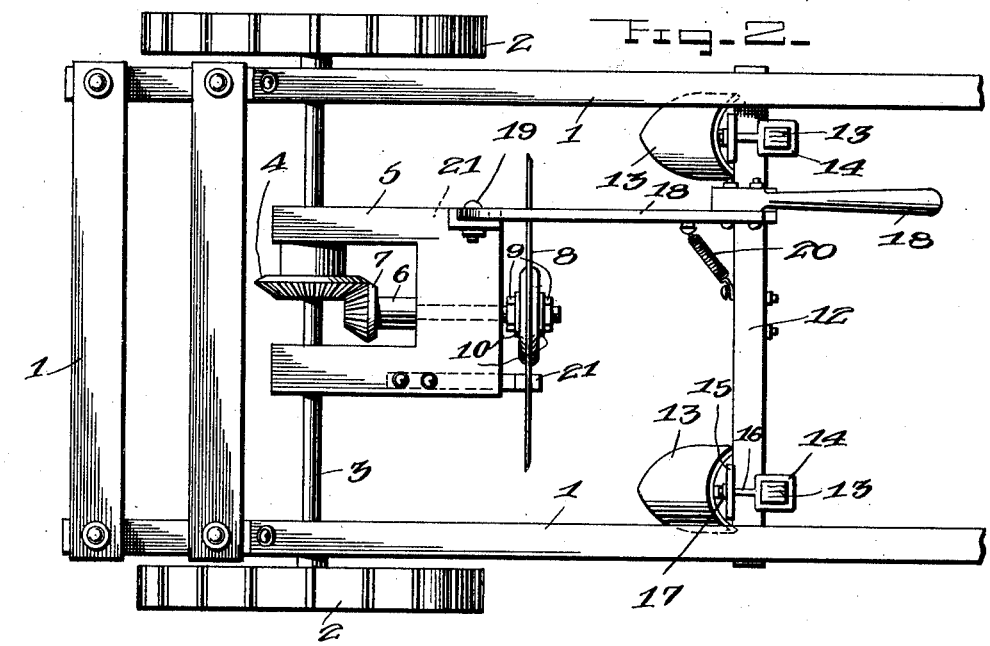
Witnesses
W. H. Rockwell
R. A. Duffie
Inventor
Robert T. Simmons
By John S. Duffie
Attorney

UNITED STATES PATENT OFFICE.

ROBERT TOLIVER SIMMONS, OF WYNNE, ARKANSAS.

COTTON-CHOPPER.

997,015.  Specification of Letters Patent.  Patented July 4, 1911.

Application filed March 17, 1910. Serial No. 549,883.

*To all whom it may concern:*

Be it known that I, ROBERT T. SIMMONS, a citizen of the United States, residing at Wynne, in the county of Cross and State of Arkansas, have invented certain new and useful Improvements in Cotton-Choppers, of which the following is a specification.

This invention has relation to improvements in cotton choppers and especially to improvements over my invention the patent upon which was issued Mar. 24, 1910, No. 959,031.

The main object of the present device is to provide means whereby the disk wheel may be so raised from normal position that it will pass over the rough, hilly places in a cotton field. I attain this by the employment of an independent frame upon which is mounted the disk wheel by suitable means. A further object for the employment of said independent frame is that we very often have what is termed "a bad stand of cotton" (small plants) and it is necessary to lift the disk wheel from the row at such places to prevent cutting said small plants.

A further object of my invention is to provide for the adjustability of the plow feet which are for the purpose of filling in the soil after the disk wheel has done its work.

With the above and other objects in view my invention consists of the novel construction and arrangement of parts as are fully described in this specification, illustrated in the accompanying drawings forming a part thereof and particularly pointed out in the appended claim.

Reference being had to the drawings: Figure 1 is a longitudinal, vertical, sectional view of my invention. Fig. 2 is a top plan view thereof.

Referring more particularly to the drawings my invention is described as follows:

The frame 1 is mounted upon the wheels 2 by means of the transverse shaft 3 upon which is keyed a beveled gear 4. Pivotally mounted upon said transverse shaft 3 is an independent frame 5, in which frame is rotatably mounted the longitudinal shaft 6, to the forward end of which is secured a beveled gear 7, which intermeshes with said beveled gear 4. The rear end of the longitudinal shaft is threaded upon which threads is screwed one of the nuts 9, then one of the washers 10 is slipped on the shaft, then the disk wheel 8 is placed in position on said shaft, after which another washer 10 is slipped in place. Lastly a second nut 10 is screwed upon the threads of the shaft until it binds against the adjacent washer with the desired pressure, holding the disk cutter as if in a vise.

Held to the rear end of the frame by metallic angle irons 11 is a crosspiece 12, whereto the adjustable plows 13 are secured. Said crosspiece may be secured to the metallic angle irons 11 by any suitable means, such as nut and bolt connections. Each plow 13 passes through the eyes of two corresponding eye bolts 14, one of which bolts extends over the upper edge of said crosspiece, the other extending under the lower edge thereof. Extending vertically against the front surface of the crosspiece 12 are two straps of bar iron 15, each of which is provided with an upper and lower perforation to receive the forward extensions 16 of a corresponding eye bolt. Said extensions 16 are threaded near their ends, which threads engage corresponding nuts 17 which bind the several parts together.

A handle 18 is adjustably secured to the independent frame 5 at its rear edge by means of nut and bolt connections 19. Resilient means, such as a helical spring 20, is interposed between the handle and the front face of said crosspiece 12. The function of this spring is to hold the disk wheel to the row. A runner 21 is secured to one side of the under face of the independent frame to prevent the disk wheel from cutting too deep.

Although I have specifically described the construction of my invention yet I may exercise the right to make such changes therein as fall within the spirit of the invention or the scope of the appended claim.

Having described my invention what I claim as new, is:

In a cotton chopper comprising a frame, a transverse shaft passing through the frame, said frame comprising a rear crosspiece, an independent frame mounted upon the shaft, said independent frame comprising a handle, a beveled gear keyed to the transverse shaft, a longitudinal shaft carried by the independent frame, a beveled gear upon the longitudinal shaft intermeshing with the beveled gear of the transverse shaft, a disk wheel upon the longitudinal shaft, and resilient means comprising a coil spring to hold the independent frame normally in lowered position, said coil spring being interposed between said handle of the independent frame and said crosspiece of the first-mentioned frame.

In testimony whereof I affix my signature, in presence of two witnesses.

ROBERT TOLIVER SIMMONS.

Witnesses:
GROVER TYER,
R. C. KNOX.

Copies of this patent may be obtained for five cents each, by addressing the "Commissioner of Patents, Washington, D. C."